(12) United States Patent
Liu (10) Patent No.: US 10,338,735 B2
(45) Date of Patent: Jul. 2, 2019

(54) TOUCH DISPLAY PANEL AND DRIVING METHOD THEREOF

(71) Applicant: HON HAI PRECISION INDUSTRY CO., LTD., New Taipei (TW)

(72) Inventor: Feng-Hsiang Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/794,303

(22) Filed: Oct. 26, 2017

(65) Prior Publication Data

US 2018/0046316 A1 Feb. 15, 2018

Related U.S. Application Data

(63) Continuation-in-part of application No. 14/820,220, filed on Aug. 6, 2015, now abandoned.

(30) Foreign Application Priority Data

May 29, 2015 (TW) .................................. 104117352

(51) Int. Cl.
| | |
|---|---|
| G06F 3/041 | (2006.01) |
| G06F 3/044 | (2006.01) |
| G02F 1/1333 | (2006.01) |
| G09G 3/36 | (2006.01) |
| G02F 1/1343 | (2006.01) |

(52) U.S. Cl.
CPC ........ *G06F 3/0416* (2013.01); *G02F 1/13338* (2013.01); *G06F 3/044* (2013.01); *G06F 3/0412* (2013.01); *G09G 3/3648* (2013.01); *G09G 3/3674* (2013.01); *G02F 1/13439* (2013.01); *G02F 1/134363* (2013.01); (Continued)

(58) Field of Classification Search
CPC .... G06F 3/0412; G06F 3/0416; G06F 3/0488; G06F 3/041
See application file for complete search history.

(56) References Cited

U.S. PATENT DOCUMENTS

9,639,191 B2    5/2017 Takeuchi et al.
2008/0252587 A1*  10/2008 Wang ..................... G09G 3/20
                                                            345/100
(Continued)

FOREIGN PATENT DOCUMENTS

| CN | 101055708 A | 10/2007 |
|---|---|---|
| CN | 103092400 A | 5/2013 |

*Primary Examiner* — Dong Hui Liang
(74) *Attorney, Agent, or Firm* — ScienBiziP, P.C.

(57) ABSTRACT

A touch display panel includes a first substrate and a drive layer on the first substrate. The drive layer includes a plurality of gate lines. The touch display panel defines at least two blocks; each block includes at least two gate lines. A driving circuit system includes a gate driver coupled to the gate lines. The touch display panel includes a plurality of drive cycles. The driving circuit system drives the blocks in sequence during each drive cycle. Each block includes at least one display scanning period Ta and a touch scanning period Tb during each drive cycle. The gate driver is configured to scan the gate lines in sequence during each Ta. For each block, the gate lines are scanned from an initial gate line to an interrupted gate line in sequence, then the Tb starts. For one block, the interrupted gate lines in different drive cycles are different.

2 Claims, 9 Drawing Sheets

(52) U.S. Cl.
CPC .. *G02F 2201/121* (2013.01); *G02F 2201/123* (2013.01); *G09G 2354/00* (2013.01)

(56) References Cited

U.S. PATENT DOCUMENTS

| | | | | |
|---|---|---|---|---|
| 2013/0113735 A1* | 5/2013 | Takeuchi | ............... | G06F 3/0412 |
| | | | | 345/173 |
| 2015/0355762 A1* | 12/2015 | Tripathi | .................... | G06T 1/20 |
| | | | | 345/173 |
| 2017/0003804 A1* | 1/2017 | Sung | ..................... | G06F 3/0412 |

* cited by examiner

TOUCH DISPLAY PANEL AND DRIVING METHOD THEREOF

CROSS-REFERENCE TO RELATED APPLICATIONS

This application is a continuation-in-part of application Ser. No. 14/820,220, filed Aug. 6, 2015 the contents of which are hereby incorporated by reference. The patent application Ser. No. 14/820,220 in turn claims the benefit of priority under 35 USC 119 from Taiwanese Patent Application No. 104117352, filed on May 29, 2015.

FIELD

The subject matter herein generally relates to a touch display panel and a driving method for a touch display panel.

BACKGROUND

Generally, a touch display device can include a display panel, a touch panel and related control circuits. A conventional in-cell touch display device can divide into a plurality of blocks; each block may include a plurality of scanning lines. For each block, display scanning and touch scanning can be done sequentially during a scanning cycle. After the display scanning and the touch scanning of one block finish, the display scanning of a next block starts. During a conventional display scanning process of each block, the scanning lines are sequentially scanned from a first scanning line to a last scanning line. When the last scanning line is scanned, the display scanning finishes and the touch scanning process of the block starts. However, for each block, the display scanning always stops at the same last scanning lines, which is bad for continuity of display.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

Figure 1:
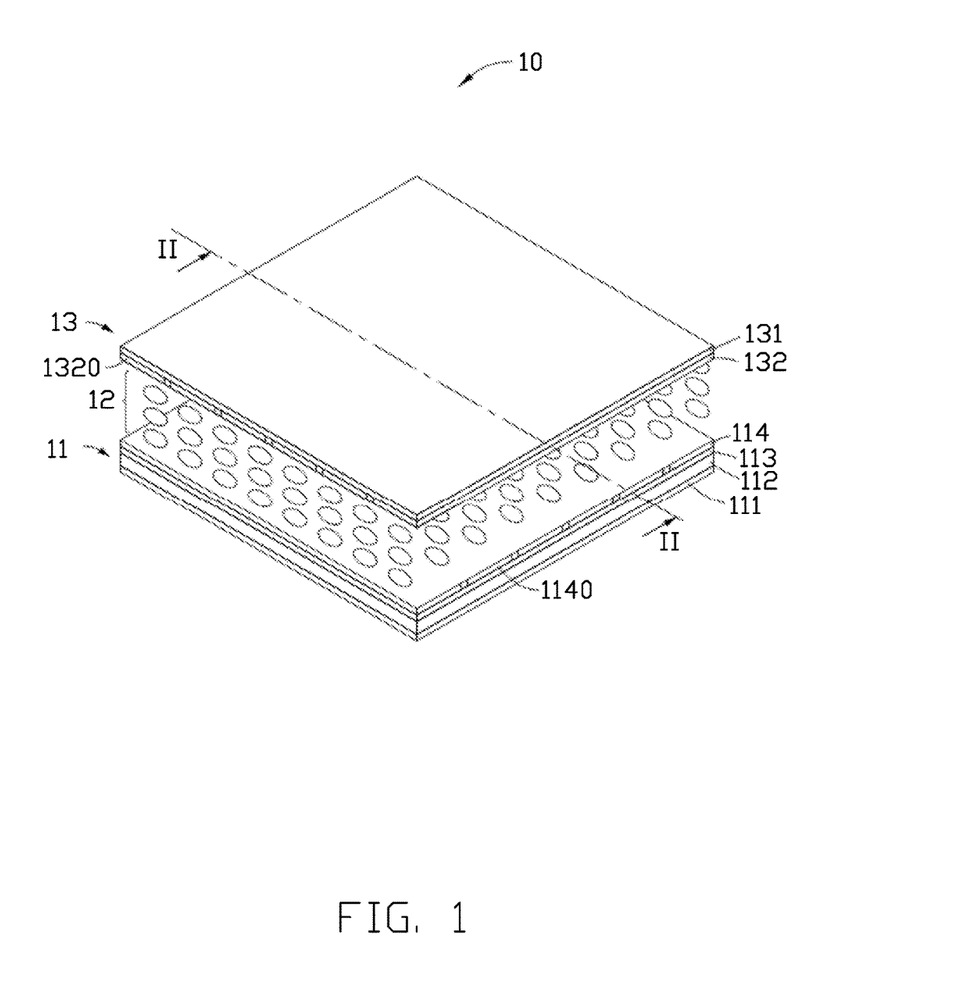
FIG. 1 is an isometric view of an exemplary embodiment of a touch display panel, the touch display panel including a first substrate.
Figure 2:
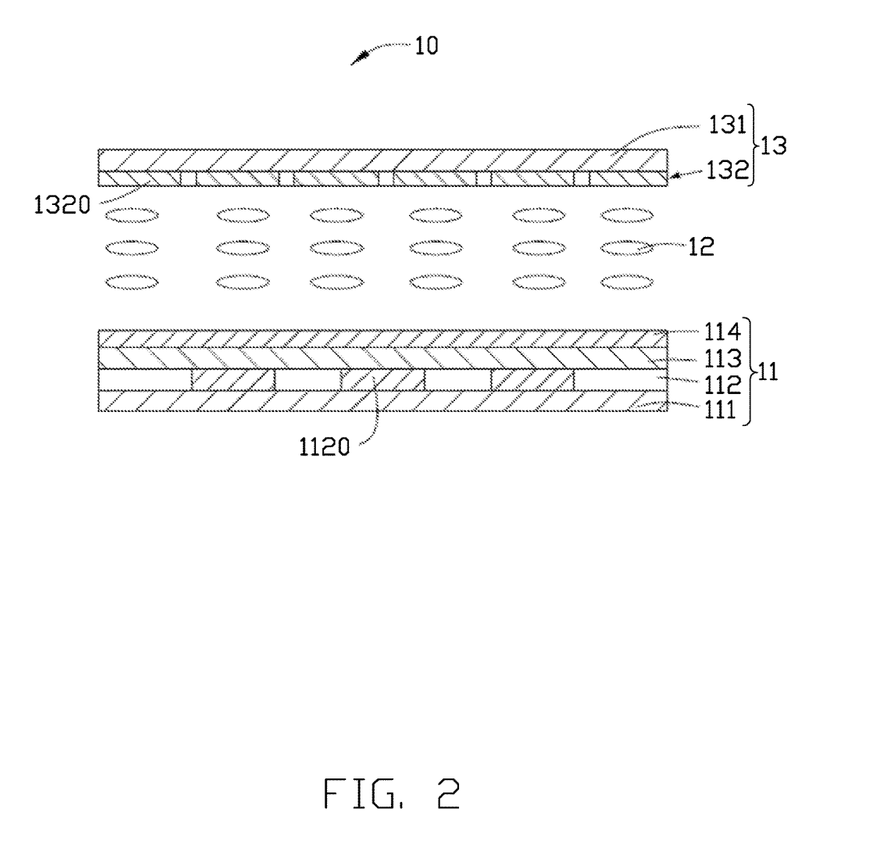
FIG. 2 is a cross sectional view taking along line II-II of the touch display panel in FIG. 1.

Referring to FIGS. 1 and 2, an exemplary embodiment of a touch display panel 10 is illustrated. In the exemplary embodiment, the touch display panel 10 can be configured to display images instantaneously in time sequence and sensing touch operations on the touch display panel 10. In the exemplary embodiment, the touch display panel 10 can be an in-cell touch display panel. In at least one exemplary embodiment, the touch display panel 10 can be any currently available touch display panel.

The touch display panel 10 can include a first substrate 11, a second substrate opposite to the first substrate 11, and a liquid crystal layer 12 arranged between the first substrate 11 and the second substrate 13. The first substrate 11 can be a TFT array substrate and can be named as to a lower substrate. The first substrate 11 can include a first substrate base 111, a driving layer 112, an insulating layer 113, and a common electrode layer 114. The driving layer 112 can be arranged on the first substrate base 111 and covered by the insulating layer 113. The driving layer 112 can include a plurality of pixel electrodes 1120 arranged in an array. The common electrode layer 114 is arranged on the insulating layer 113 and can include a plurality of common electrodes 1140. A horizontal electric field can be generated between the plurality of pixel electrodes 1120 and the plurality of common electrodes 1140, which can drive liquid crystal molecules of the liquid crystal layer 12 to rotate so as to cause the touch display device to display images.

The second substrate 13 can be named as an upper substrate or a color film substrate. The second substrate 13 can include a second substrate base 131 and a touch sensitive electrode layer 132. The touch sensitive electrode layer 132 can include a plurality of touch sensitive electrodes 1320 arranged at regular interval along a first direction. The touch sensitive electrodes 1320 can be configured to detect touch operations on the touch display panel 10. The common electrodes 1140 can also used as touch driving electrodes, and the touch sensitive electrodes 1320 operate with the common electrodes 1140 to identify positions where the touch operations are applied.

In the exemplary embodiment, the first substrate base 111 and the second substrate base 131 can be made of transparent glass or plastics. The pixel electrodes 1120, the common electrodes 1140, and the touch sensitive electrodes 1320 can be made of Indium Tin Oxide (ITO) or Indium Zinc Oxide (IZO). In at least one exemplary embodiment, the first substrate base 111 and the second substrate base 131 can be made of any suitable materials. The pixel electrodes 1120, the common electrodes 1140, and the touch sensitive electrodes 1320 can be made of any suitable materials.

Figure 3:
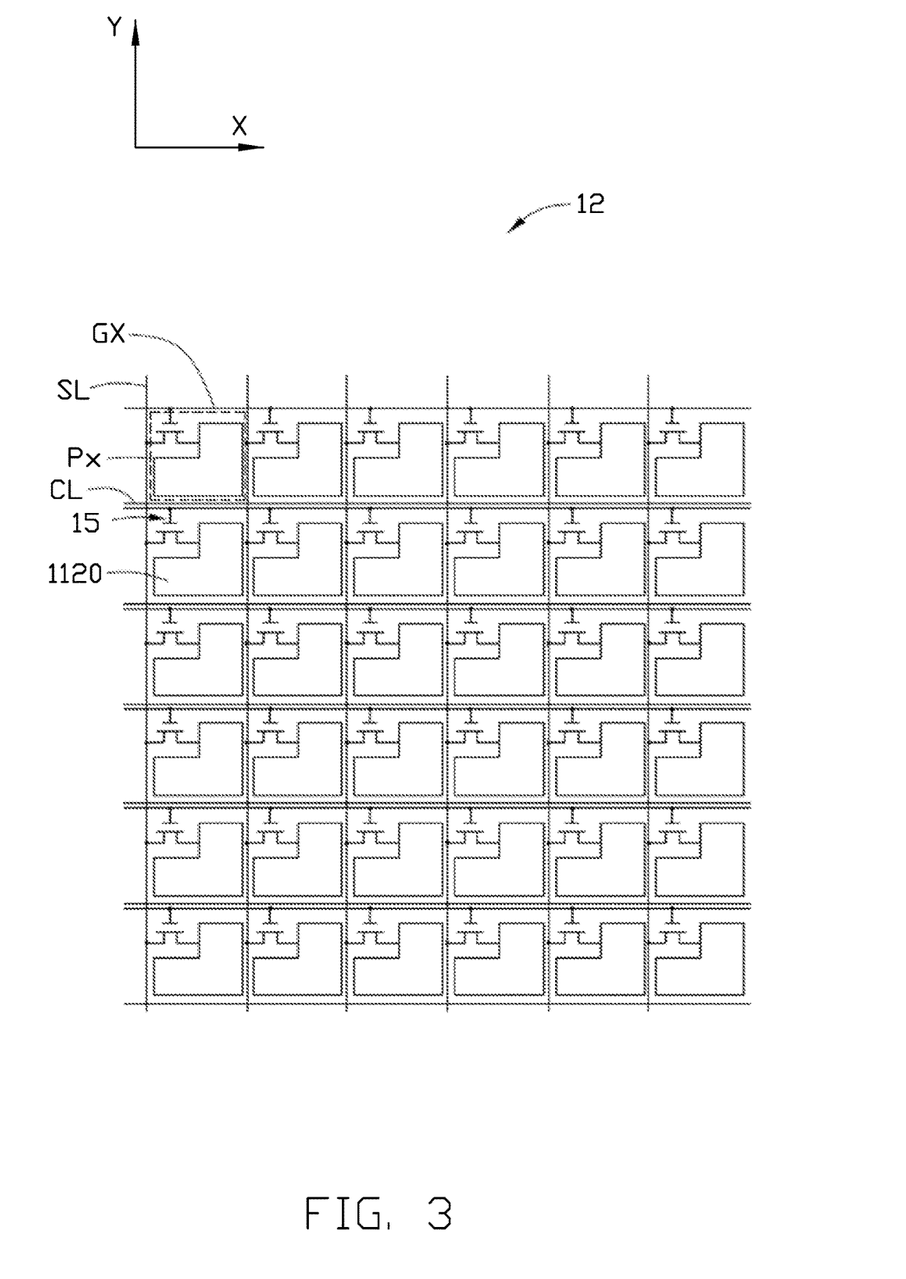
FIG. 3 is a diagrammatic view of an exemplary embodiment of a driving layer of the first substrate in FIG. 1.

Referring to FIG. 3, a diagrammatic view of an exemplary embodiment of the driving layer 112 is illustrated. The driving layer 112 can include a plurality of gate lines (GLs) parallel to each other, a plurality of source lines (SLs) which are insulated from and intersect the GLs, and a plurality of common electrode lines (CLs) which are insulated from the GLs and CLs and are parallel to the GLs. The GLs can be named as scanning lines and the SLs can be named as data lines. The GLs, CLs and the SLs intersect with each other to define a plurality of pixel units Pxs which are arranged in a rectangle configuration. Each pixel unit Px can include a Thin Film Transistor (TFT) 15 and a pixel electrode 1120 electrically coupled with the TFT 15. The GLs and the CLs extend along a first direction (For example, along X axis), while the SLs extends along a second direction (for example, along Y axis) different from the first direction.

Figure 4:
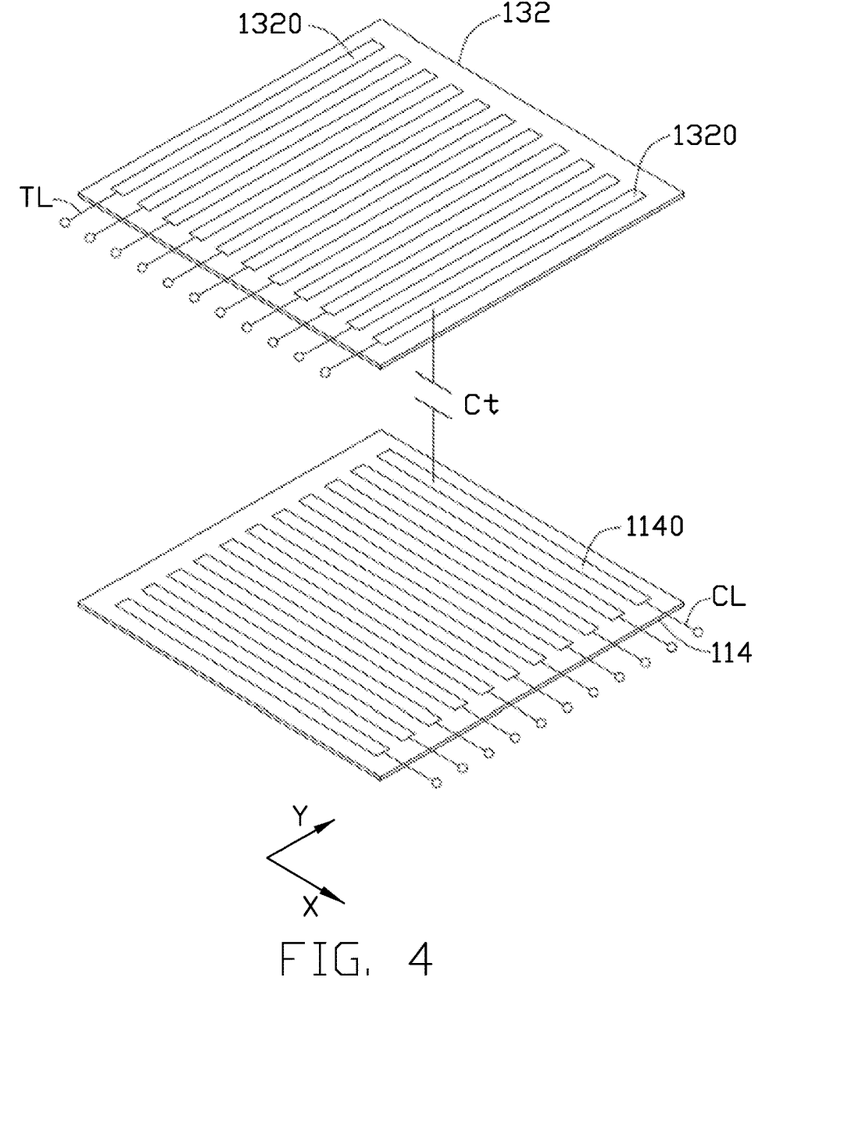
FIG. 4 is a diagrammatic view of an exemplary embodiment of a relationship between the driving layer and common electrodes.

Referring to FIGS. 3 and 4, the plurality of common electrodes 1140 can be spaced arranged along the second direction and can be insulated from each other. Each common electrode 1140 can be coupled with one of the common electrode lines CLs and can be in a substantially rectangle shape. Each common electrode 1140 can be corresponding to a row of pixel units Pxs. That is, the number of the common electrodes 1140 can equal to the number of rows of the pixel units Pxs. Orthographic projection of each common electrode at a plane where the plurality of pixel units Pxs is located can overlap a corresponding row of pixel units Pxs. In at least one exemplary embodiment, the common electrode 1140 can be in any other suitable shape, for example, parallelogram, ellipse.

The plurality of touch sensitive electrodes 1320 can be spaced arranged along the first direction and can be insulated from each other. The plurality of touch sensitive electrodes 1320 can be insulated from and intersect the plurality of common electrodes 1140. In the exemplary embodiment, the touch sensitive electrodes 1320 can be in a substantially rectangle shape. When the touch sensitive electrodes 1320 and the common electrodes 1140 are powered, a sensing capacitance Ct is generated between the touch sensitive electrodes 1320 and the common electrodes 1140 to detect touch operations on the touch display panel 10. Alternatively, the touch sensitive electrodes 1320 can be substituted for some signal lines arranged at the first substrate 11, for example, extra sensing electrodes arranged on the first substrate 11.

Figure 5:
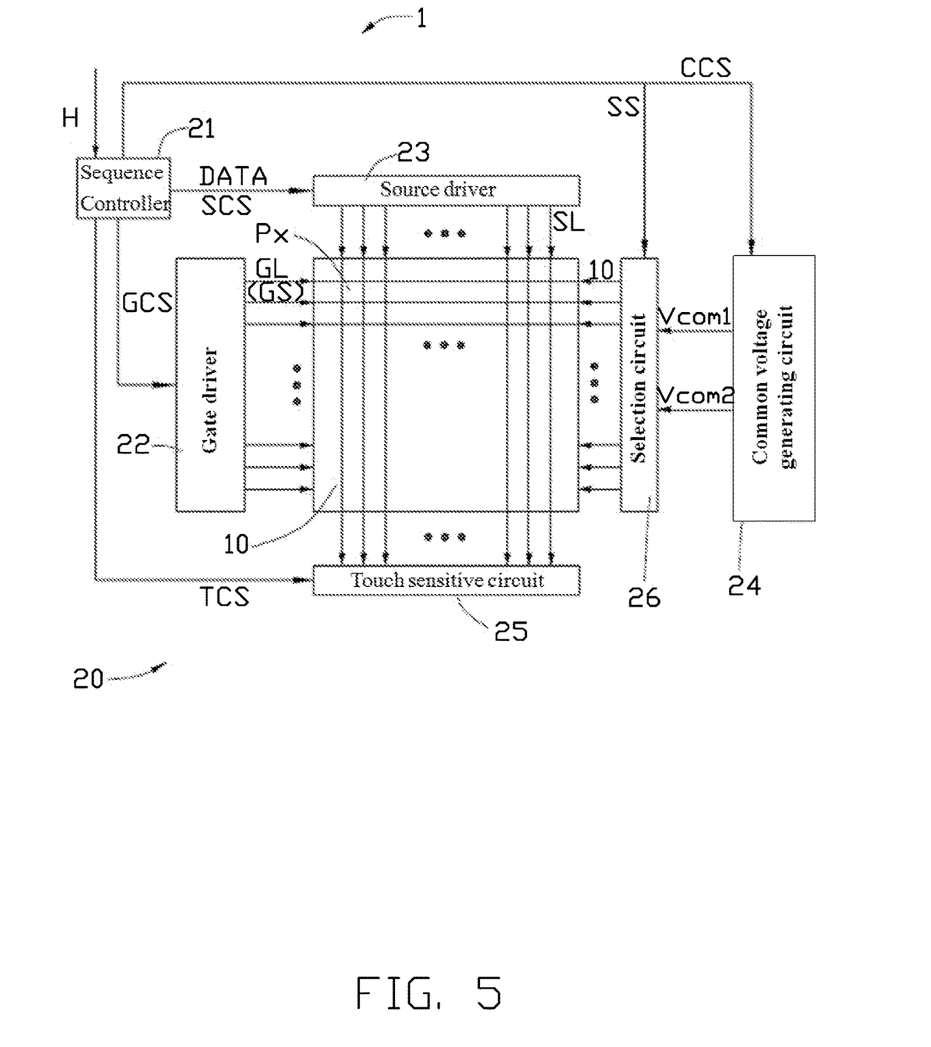
FIG. 5 is a block diagram of an exemplary embodiment of an in-cell touch display device including a touch display panel.

Referring to FIG. 5, a block diagram of an exemplary embodiment of an in-cell touch display device 1 is illustrated. The in-cell touch display device 1 can include the touch display panel 10 and a driving circuit system 20. In detail, the driving circuit system 20 can be configured to drive the touch display panel 10 to display images and to detect touch operations on the touch display panel 10. In the exemplary embodiment, the driving circuit system 20 can include a sequence controller 21, a gate driver 22, a source driver 23, a common voltage generating circuit 24, a touch sensitive circuit 25, and a selection circuit 26. It should be noted that the name of all the elements shown and described above are used for illustrative purpose only and cannot be limitations to the embodiments. In at least one embodiment, the gate driver 22 and the source driver 23 can be substituted for a display driver (or a display driving chip or a display driving circuit).

The sequence controller 21 can be configured to receive horizontal synchronizing signals H from an outside system, output gate control signals GCS to the gate driver 22, output source control signals SCS and image data DATA to the source driver 23, output common voltage control signals CCS to the common voltage generating circuit 24, and output selection signals SS to the selection circuit 26. The sequence controller 21 further can be configured to output touch control signals TCS to the touch sensitive circuit 25.

The gate driver 22 can be coupled to the pixel unit Px through the GLs, and can transmit gate signals GS (also named as scanning signals) to the pixel unit Px through the GLs in response to the gate control signals GCS so as to selectively enable corresponding pixel units PXs. The source driver 23 can be coupled to the pixel unit Px through the SLs, and can transmit the image data DATA to the pixel unit Px through the SLs so as to cause the pixel unit Pxs to display images.

The common voltage generating circuit 24 can be configured to generate common voltages with at least two different waveforms. In the exemplary embodiment, the common voltages with at least two different waveforms can include a first common voltage Vcom1 and a second common voltage Vcom2. The first common voltage Vcom1 can be a direct voltage (DC) with a first constant voltage. The second common voltage Vcom2 can be an alternating voltage (AC) with a voltage varying between a second constant voltage and a third constant voltage. The second common voltage Vcom2 can be served as touch control signals applied to the common electrodes 1140. In the exemplary embodiment, the second constant voltage can be 0V, while the third constant voltage can be 3.5V. In at least one embodiment, the second constant voltage and the third constant voltage can be any other suitable values.

The selection circuit 26 can be coupled to the common voltage generating circuit 24 and be coupled to the common electrodes 1140 by the CLs. The selection circuit 26 can be configured to receive the first common voltage Vcom1 and the second common voltage Vcom2 and to transmit the first common voltage Vcom1 and the second common voltage Vcom2 to corresponding common electrodes 1140 in response to the selection signals SS.

The touch sensitive circuit 25 can be coupled to the touch sensitive electrodes 1320 through touch sensitive lines TLs and to receive touch signals TS in response to the touch control signals TCS. The touch sensitive circuit 25 can be configured to process and analyze the touch signals TS so as to identify a position where a touch operation applied on the touch display panel 10.

Figure 6:
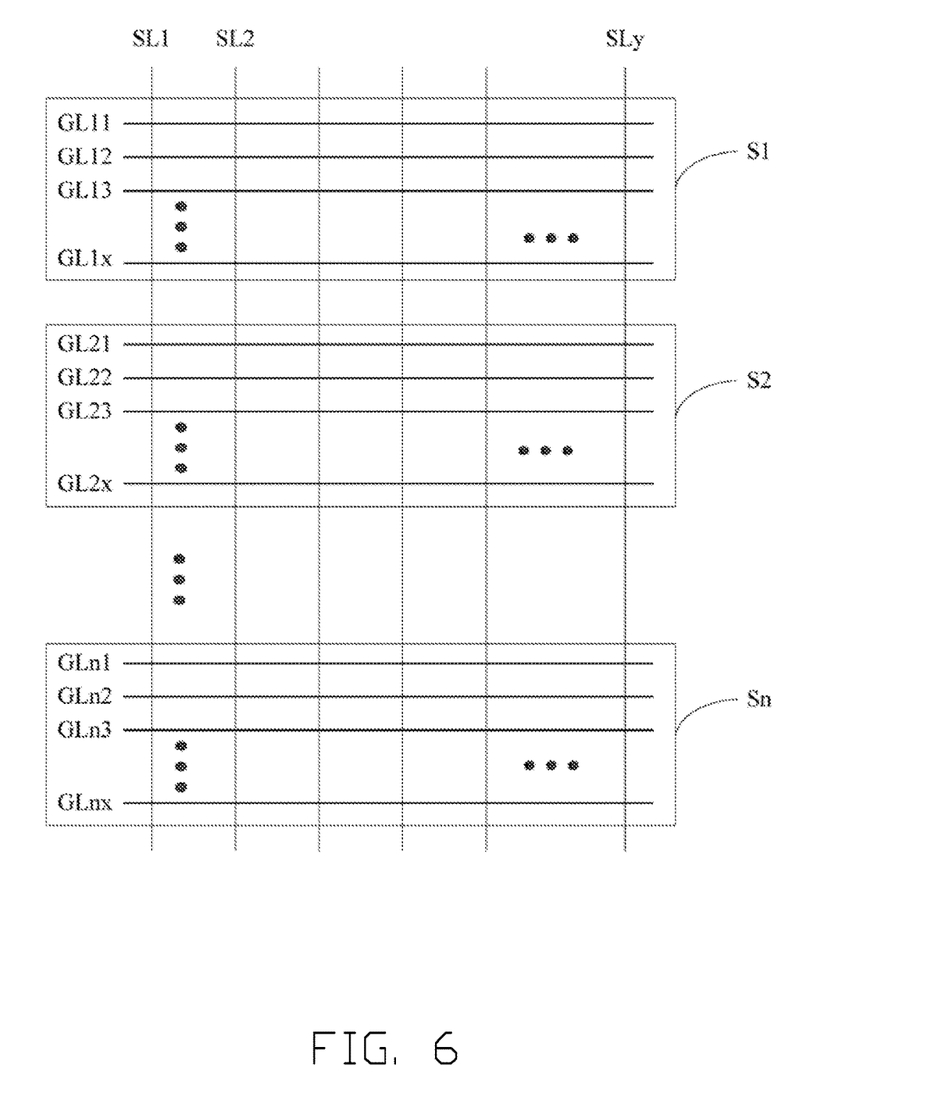
FIG. 6 is a diagrammatic view of an exemplary embodiment of a configuration of blocks of a touch display panel.

Referring to FIG. 6, a diagrammatic view of an exemplary embodiment of a configuration of blocks of a touch display panel is illustrated. In the exemplary embodiment, the touch display panel 10 can define n blocks, for example, S1, S2 ... Sn, n>=2. At least one of the n blocks can include two or more GLs. In the exemplary embodiment, all the blocks can include same number of GLs.

Figure 7:
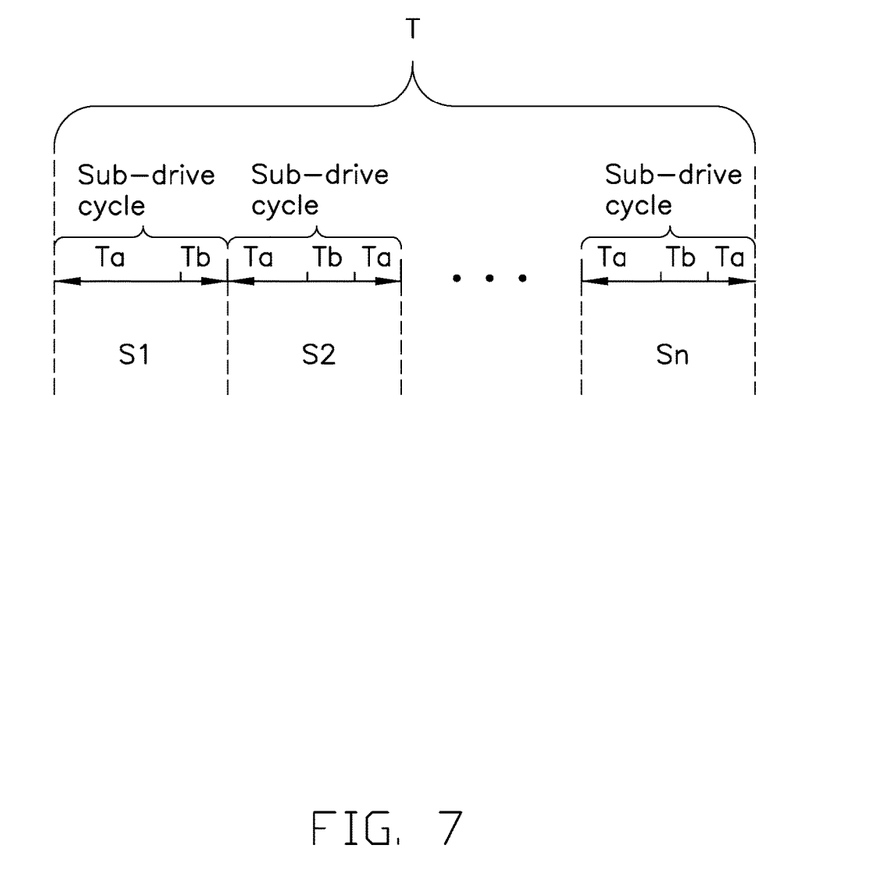
FIG. 7 is a diagrammatic view of a drive cycle T of the touch display panel.

The touch display panel 10 is driven by a time-division multiplexing (TDM) method. As shown in FIG. 7, the n blocks of the touch display panel 10 can be driven in sequence from a first block S1 to a last block Sn. Each drive cycle T of the touch display panel 10 may include n sub-drive cycles; each sub-drive cycle corresponds to one of the n blocks. For each block, display scanning and touch scanning can be done during a sub-drive cycle. For example, after the display scanning and the touch scanning of the block S1 finish, the display scanning and the touch scanning of the block S2 starts.

The gate driver 22 can transmit the gate control signals GCS to the GLs of each block so as to drive the touch display panel 10 to display images. The sub-drive cycle of each block may include at least one display scanning period Ta and a touch scanning period Tb as shown in FIG. 7. During the display scanning period Ta, the gate driver 22 scans the GLs so as to drive the touch display panel 10 to display images. During the touch scanning period Tb, the common electrodes 1140 are applied with touch scanning signals so as to detect touch operations on the touch display panel 10.

During each display scanning period Ta, the common electrodes 1140 can be applied a constant voltage, while during each touch scanning period Tb, the common electrodes 1140 can be applied alternating voltages (the touch control signals), thus the touch sensitive circuit 25 can detect touch operations by detecting voltage variation of the touch sensitive electrodes 1320.

For each block, display scanning before touch scanning period can be interrupted at different GLs. For each block, at least one gate line of the block is scanned from an initial gate line to an interrupted gate line in sequence, and then the touch scanning period Tb starts. For one of the at least two blocks, the interrupted gate lines in different drive cycles are different.

Figure 8:
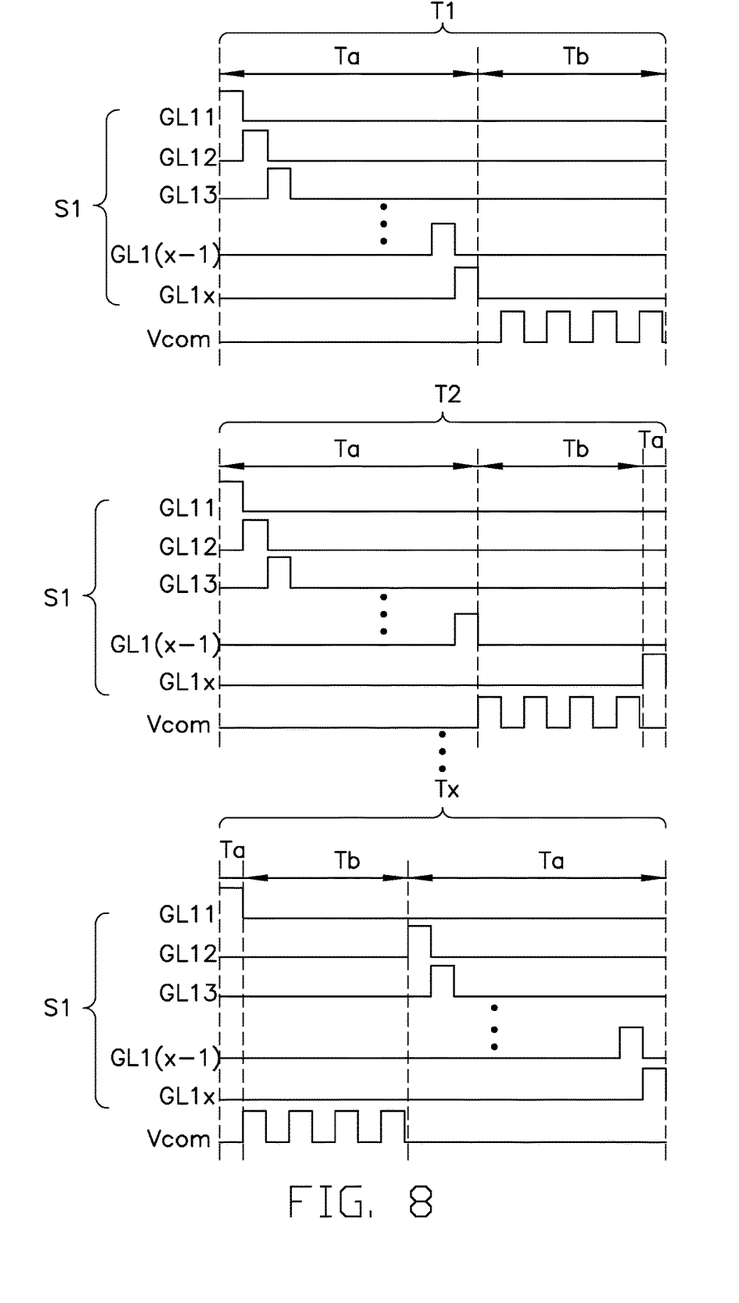
FIG. 8 is a diagrammatic view of an exemplary embodiment of sequential waveforms in different drive cycles caused by gate driver scanning gate lines of a block S1 in FIG. 6.

For example, as shown in FIG. 8, for a selected block S1, there are a plurality of gate lines GL11, GL12, GL13 . . . GL1(x-1), and GL1x arranged in order. The block S1 includes x gate lines, for example x>=5. As shown in FIG. 8, for the first drive cycle T1 of the touch display panel 10, the gate driver 22 scans the gate lines of the block S1 in sequence in an order of GL11, GL12, GL13 . . . GL1(x-1), and GL1x, and then the touch scanning starts. As shown in FIG. 8, for the second drive cycle T2 of the touch display panel 10, the gate driver 22 scans the gate lines of the block S1 in sequence in an order of GL11, GL12, GL13 . . . GL1(x-1), and then the touch scanning starts; after the touch scanning finishes, the gate driver 22 scan the gate line GL1x. For the $x^{th}$ drive cycle Tx of the touch display panel 10, the gate driver 22 scans the gate lines GL11 of the block S1, and then the touch scanning starts; after the touch scanning finishes, the gate driver 22 scans the gate lines of the block S1 in sequence in an order of GL12, GL13 . . . GL1(x-1), and GL1x. FIG. 8 shows in successive drive cycles, each gate line of the block S1 is selected as the interrupted gate line in an order that is contrary to the order the gate lines being arranged.

Figure 9:
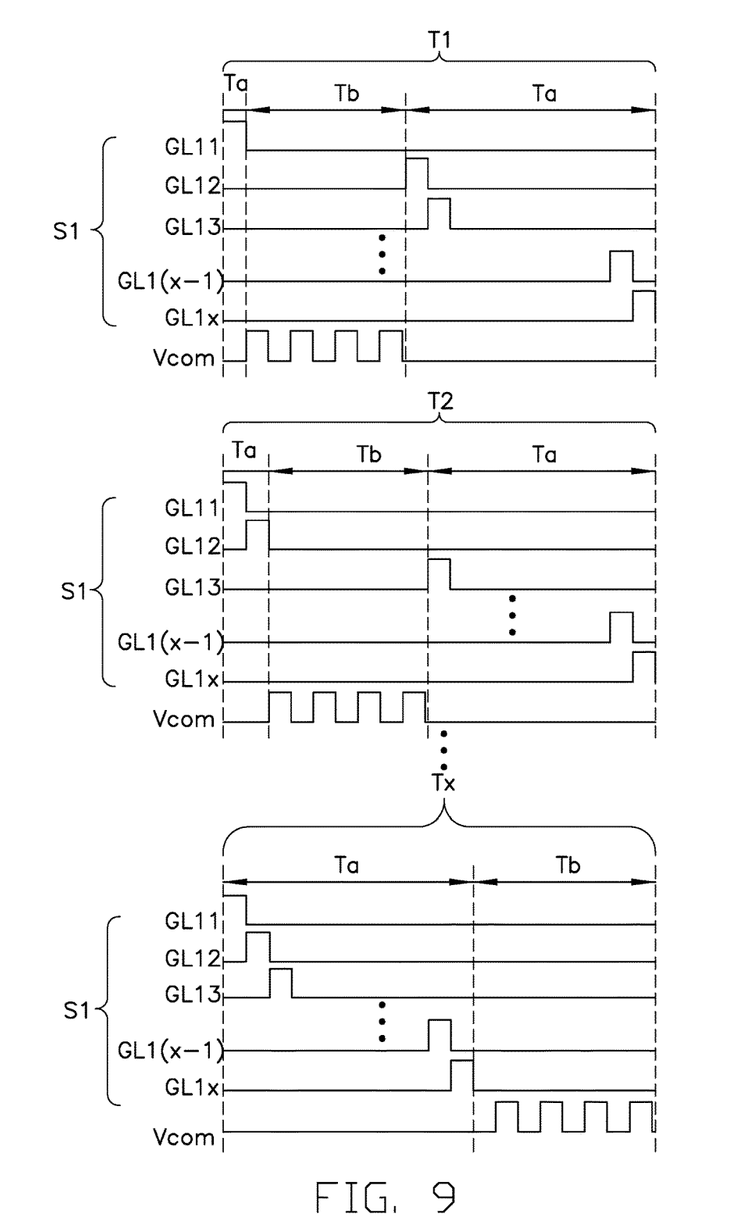
FIG. 9 is a diagrammatic view of another exemplary embodiment of sequential waveforms in different drive cycles caused by gate driver scanning gate lines of a block S1 in FIG. 6.

FIG. 9 illustrates different sequential waveforms of the gate lines of the block S1 in different drive cycles. As shown in FIG. 9, for the first drive cycle T1 of the touch display panel 10, the gate driver 22 scans the gate lines GL11 of the block S1, and then the touch scanning starts; after the touch scanning finishes, the gate driver 22 scans the gate lines of the block S1 in sequence in an order of GL12, GL13 . . . GL1(x-1), and GL1x. As shown in FIG. 9, for the second drive cycle T2 of the touch display panel 10, the gate driver 22 scans the gate lines of the block S1 in sequence in an order of GL11 and GL12, and then the touch scanning starts; after the touch scanning finishes, the gate driver 22 scans the gate lines of the block S1 in sequence in an order of GL13 . . . GL1(x-1), GL1x. Finally, as shown in FIG. 9, for the $x^{th}$ drive cycle Tx of the touch display panel 10, the gate driver 22 scans the gate lines of the block S1 in sequence in an order of GL11, GL12, GL13 . . . GL1(x-1), GL1x, and then the touch scanning starts. FIG. 9 shows in successive drive cycles, each gate line of the block S1 is selected as the interrupted gate line in an order that is same with the order the gate lines being arranged.

In at least one exemplary embodiment, the gate driver 22 can scan the gate lines in sequence during each display scanning period. The drive cycle of each block may include at least one display scanning period Ta and a touch scanning period Tb. The display scanning period is interrupted and then a touch scanning period starts. For each block in different drive cycles, display scanning before the touch scanning period can be interrupted at different GLs. The display scanning period before the touch scanning period can be interrupted at any predefined gate line so that the interrupted GLs of each block of the successive drive cycle can be different.

It can be understood that each gate line of the block S1 may be selected as the interrupted gate line in a random order, not limited to an order shown in FIG. 8 and FIG. 9.

The sequential waveforms applied to the gate lines of other blocks in different drive cycles can be the same with that of the block S1 as shown in FIG. 8 and FIG. 9.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A touch display panel comprising:
   a first substrate;
   a drive layer on the first substrate, the drive layer including a plurality of gate lines and a plurality of source lines intersected with the plurality of gate lines; the touch display panel defining at least two blocks, each of the at least two blocks including at least six of the plurality of gate lines; and
   a driving circuit system comprising a gate driver coupled to the plurality of gate lines, the touch display panel comprising a plurality of drive cycles, the driving circuit system driving the at least two blocks in sequence during each of the plurality of drive cycles;
   wherein each of the at least two blocks includes at least one display scanning period Ta and a touch scanning period Tb during each of the plurality of drive cycles;
   wherein the gate driver is configured to scan the gate lines in sequence during each of the at least one display scanning period Ta; wherein for each of the at least two blocks, at least one of the at least six of the plurality of gate lines is scanned from an initial gate line to an interrupted gate line in sequence, and then the touch scanning period Tb starts; and wherein for one of the at least two blocks, the interrupted gate lines in different drive cycles are different;
   wherein for one of the at least two blocks in successive drive cycles, each gate line of the one of the at least two blocks is selected as the interrupted gate line in an order that is same with an order the gate lines being arranged.

2. A drive method for driving a touch display panel, the touch display panel comprising a first substrate and a drive layer on the first substrate, the drive layer including a plurality of gate lines and a plurality of source lines intersected with the plurality of gate lines; the touch display panel defining at least two blocks, each of the at least two blocks including at least six of the plurality of gate lines, the method comprising:

scanning, at one block of the touch display panel, at least one of the at least six gate lines from an initial gate line to an interrupted gate line in sequence during a first display scanning period of each drive cycle;

detecting, at the one block of the touch display panel, touch operations applied on the touch display device during each touch scanning period of each drive cycle; and     wherein for the one block, the interrupted gate lines are different in the first display scanning period of different drive cycles;

wherein for one of the at least two blocks in successive drive cycles, each gate line of the one of the at least two blocks is selected as the interrupted gate line in an order that is same with an order the gate lines being arranged.

* * * * *